United States Patent [19]

Stigsson et al.

[11] Patent Number: 5,205,908

[45] Date of Patent: Apr. 27, 1993

[54] PURIFICATION OF PROCESS GAS FROM A PARTIAL COMBUSTION OF BLACK LIQUOR

[75] Inventors: Lars Stigsson, Bjärred; Nils Bernhard, Täby, both of Sweden

[73] Assignee: Chemrec Aktiebolag, Danderyd, Sweden

[21] Appl. No.: 698,657

[22] Filed: May 10, 1991

[30] Foreign Application Priority Data

May 31, 1990 [SE] Sweden ............................. 9001957

[51] Int. Cl.$^5$ ........................................ D21C 11/06
[52] U.S. Cl. .............................. 162/30.1; 423/225;
423/563; 423/566.2; 423/576.4; 423/DIG. 3
[58] Field of Search ................... 423/225, 566.2, 563,
423/576.4, DIG. 3; 162/30.1

[56] References Cited

U.S. PATENT DOCUMENTS

| | | | |
|---|---|---|---|
| 3,083,077 | 3/1963 | Björkman et al. | 423/DIG. 3 |
| 3,431,165 | 3/1969 | Buxton, Jr. | 423/DIG. 3 |
| 4,431,617 | 2/1984 | Farin | 423/232 |
| 4,808,264 | 2/1989 | Kignell | 162/30.1 |

FOREIGN PATENT DOCUMENTS 2165770  4/1986  United Kingdom ............. 423/566.2

Primary Examiner—Gary P. Straub
Assistant Examiner—Timothy C. Vanoy
Attorney, Agent, or Firm—Brumbaugh, Graves, Donohue & Raymond

[57] ABSTRACT

The present invention relates to a process for the separation of sulphur and sodium compounds from a hot process gas generated during gasification of spent liquor from the kraft pulping industry, through contact with hydrogen sulphide ion and hydroxide ion containing alkaline liquids in two or more stages, whereby the process gas in a first stage passes through a venturi throat and/or liquid trap where it is brought into contact with an alkaline washing liquid, whereby melt droplets in the process gas are separated from the gas flow and drawn off as an aqueous solution, whereby the process gas in a subsequent washing stage is brought into contact with a finely dispersed washing liquid containing hydroxide ions and hydrogen sulphide ions with a molar ratio greater than 4:1.

7 Claims, 1 Drawing Sheet

PURIFICATION OF PROCESS GAS FROM A PARTIAL COMBUSTION OF BLACK LIQUOR

TECHNICAL FIELD

The present invention relates to a process for the separation of sulphur and sodium compounds from a process gas generated during gasification of spent liquor, such as black liquor from the kraft pulping industry, whereby the compounds are removed by washing in one or more stages by bringing them into contact with hydroxide ion and hydrogen sulphide ion containing alkaline liquids which are normally present in said industry.

The object of the present invention is to obtain a process where a substantially pure process gas, essentially free of sodium and sulphur compounds is obtained.

BACKGROUND OF THE INVENTION

During gasification of carbonaceous material such as e.g. black liquor a combustible gas is formed, hereafter referred to as process gas, comprising carbon monoxide, carbon dioxide, and hydrogen. The process gas obtained varies in purity according to the quality of the original fuel with regard to sulphur content and ash composition.

A number of gasification processes operate at temperatures so high that inorganic compounds form molten ashes, while other processes operate at lower temperatures where the ashes remain in solid or partly solid form during the course of gasification. Gasification of black liquor is normally performed at temperatures between 700° and 1000° C.

SE-B-448,173 discloses a process for the recovery of chemicals and energy from cellulose spent liquors obtained from the pulping industry and shows partial combustion of black liquor at reactor pressures above ambient, whereby a melt of the mineral part of the spent liquor is obtained together with a process gas, which is cooled by passaging thereof through a liquid trap containing an alkaline solution while the mineral melt is dissolved in said alkaline solution. The process gas then passes through different washing stages one of which may use a sodium hydroxide solution as the washing liquid.

A characteristic feature of black liquor is its high reactivity which, i.a., can be related to the high oxygen content of the dry solids, and the catalytic effect of sodium and sodium compounds.

Another characteristic feature is that an inorganic phase having a low melting point is developed during gasification of black liquor. This melt phase consists essentially of water soluble sodium and sulphur compounds in contrast to conventional coal ashes which contain only a small amount of water soluble compounds.

It is of importance that the carbon conversion during gasification is kept at a high level and therefore the temperature in the gasification reactor should be kept above 700° C.

During combustion of kraft spent liquors a fine aerosol containing sodium compounds is often formed. This aerosol is very difficult to separate mechanically, and this in combination with melt droplets carry over represents a serious problem in connection with gasification of black liquor.

The sulphur in the black liquor forms gaseous, liquid and solid compounds during gasification. In the melt phase the sulphur is present mainly in the form of sodium sulphide and in the gas phase as hydrogen sulphide.

The chemical equilibriums of importance in the present washing system are as follows:

$$Na_2CO_3 + H_2O \rightarrow NaHCO_3 + NaOH \quad (1)$$

$$Na_2S + H_2O \rightarrow NaHS + NaOH \quad (2)$$

$$2NaOH + CO_2 \rightarrow Na_2CO_3 + H_2O \quad (3)$$

$$2NaHS + CO_2 \rightarrow Na_2CO_3 + H_2S \quad (4)$$

$$NaOH + H_2S \rightarrow NaHS + H_2O \quad (5)$$

During absorption of hydrogen sulphide in sodium alkaline solutions $Na_2S$ and $NaHS$ are formed. At high $CO_2$ partial pressure and high concentration of sulphide ions in the liquid bulk hydrogen sulphide can be released during formation of sodium carbonate. This is undesirable and prevented in the present invention as shown in the description below.

Selective absorption of hydrogen sulphide in the system is encouraged by short contact time and a large contact surface between the wash liquid and the gas bulk. This is best achieved by atomizing the wash liquid e.g., in one or more spray nozzles. The absorption process can be carried out in a spray tower with or without packing.

The object of the present invention is to promote capture of hydrogen sulphide according to equilibriums (4), (5) and to suppress sodium carbonate formation according to equilibriums (1), (3) and (4). The used wash liquid in the first stage contains a high concentration of hydrogen sulphide ions and should therefore not be used as wash liquid in the subsequent washing stages of the present invention, as this would encourage reformation of undesirable gaseous hydrogen sulphide. To avoid undesirable reformation of gaseous hydrogen sulphide and to promote the capture thereof the wash liquids in the later washing stages should contain a considerably higher concentration of hydroxide ions relative to hydrogen sulphide ions.

Environmental protection is becoming increasingly important for the process industry and no less important for the pulping industry where i.a., closed chemical loops are desirable. Alkaline liquids internally generated in the kraft mill are suitable for use as wash liquids in the present invention and the spent wash liquors are suitable for preparation of cooking liquor.

DESCRIPTION OF THE PRESENT INVENTION

The object of the present invention is achieved by bringing the process gas in contact with alkaline wash liquids containing hydrogen sulphide ions and hydroxide ions in at least two separate stages, whereby the invention is characterized the process gas in the first stage is passed through a cooling and washing stage designed as a venturi throat and/or a liquid trap where an aqueous liquid is injected into the gas stream, whereby melt drops carried in said stream are dissolved and separated from the gas as an aqueous solution containing mainly $Na_2CO_3$, $NaHS$, and $NaOH$, whereby the process gas in a subsequent washing stage is brought into contact with an alkaline washing liquid containing hydroxide ions and hydrogen sulphide ions with an internal molar ratio greater than 4:1.

The first cooling and washing stage designed as a liquid trap and/or a venturi throat should preferably be arranged in direct connection with the gasification reactor or arranged after the separation of all or parts of the inorganics.

In this first stage the gas is brought into contact with an alkaline aqueous solution containing i.a. sodium hydroxide, sodium carbonate and sodium hydrogen sulphide in such a way that the solid and liquid inorganics formed are separated from the gas, while gaseous hydrogen sulphide reacts with the alkaline washing liquid forming $Na_2S$ and NaSH. Water, which renders the system less sensitive to encrustation, can be used either wholly or partly instead of the alkaline liquid in this stage. Dissolution of sodium carbonate from the melted drops in the gas flow will rapidly make this water alkaline. The liquid obtained which is similar to green liquor in its composition, is drawn off, optionally after some recirculation, and transferred to the mill green liquor system. Simultaneously the temperature of the process gas is reduced to below the boiling point of the washing liquid.

In a subsequent washing stage the process gas is once again brought into contact with an alkaline washing liquid, where the hydrogen sulphide content of the gas is further reduced. The gas is simultaneously cooled to below 65° C. The temperature of the washing liquid should not exceed 50° C. prior to the entry into this washing stage.

A preferred embodiment according to the invention is to perform the washing of the gas in three or more stages whereby the gaseous hydrogen sulphide concentration can be further reduced. The washing liquid in a later washing stage, should preferably have a higher hydroxide ion/hydrogen sulphide ion ratio than in the previous washing stage.

The washing liquids of the present invention are preferably prepared from the internal liquor system of the pulp mill. The use of sodium hydroxide solution as washing liquid is also possible, but is much more expensive.

During pulping according to the sulphate pulping method a cooking liquor called white liquor having the following approximative composition is used:

| | |
|---|---|
| sodium hydroxide, NaOH | 80–120 g/l |
| sodium sulphide, $Na_2S$ | 20–50 g/l |
| sodium carbonate, $Na_2CO_3$ | 10–30 g/l |
| sodium sulphate, $Na_2SO_4$ | 5–10 g/l |
| (All compounds calculated as sodium hydroxide). | |

A diluted solution called weak liquor is obtained during washing of the lime sludge. Weak liquor can be regarded as a less concentrated white liquor meaning that the ratio between the different compounds is roughly the same as in white liquor.

The green liquor primarily present in the system which is converted to white liquor is composed approximately as follows:

| | |
|---|---|
| sodium carbonate, $Na_2CO_3$ | 90–105 g/l |
| sodium sulphide, $Na_2S$ | 20–50 g/l |
| sodium hydroxide, NaOH | 15–25 g/l |
| sodium sulphate, $Na_2SO_4$ | 5–10 g/l |
| (All compounds calculated as sodium hydroxide). | |

Both white liquor and weak liquor are excellent washing liquids and should be used during application of the present invention. For washing systems for large capacities the amount of weak liquor internally available is not sufficient for satisfactory absorption of $H_2S$ from the process gas. In such cases the washing liquid is prepared from the white liquor.

Green liquor is not suitable as washing liquid in the later washing stages as the molar ratio between hydroxide ions and hydrogen sulphide ions is insufficient or only about 3:1.

BRIEF DESCRIPTION OF THE DRAWING

The attached drawing is a schematic illustration of a plant for the generation and washing of process gas in accordance with the present invention.

Hereby 1 denotes a reactor for the gasification of black liquor in the upper end of which the black liquor is introduced and combusted. Washing liquid in the form of a cooled weak liquor is introduced through a line 2 in the intermediate section of the reactor 1, and the green liquor hereby formed is drawn off through a line 3. The process gas is drawn off through a line 4 to a venturi 5 where it is washed using an alkaline solution in accordance with the process described above, whereupon the gas is fed into a scrubber 6 wherein the gas is washed using an alkaline solution in the form of weak liquor added through a line 8, whereupon the gas is washed using water before the clean gas is drawn off from the top of the scrubber through a line 9. Green liquor formed is drawn off through a line 7 from the bottom of the scrubber 6, where line 7 is combined with the line 3.

Figure 1:
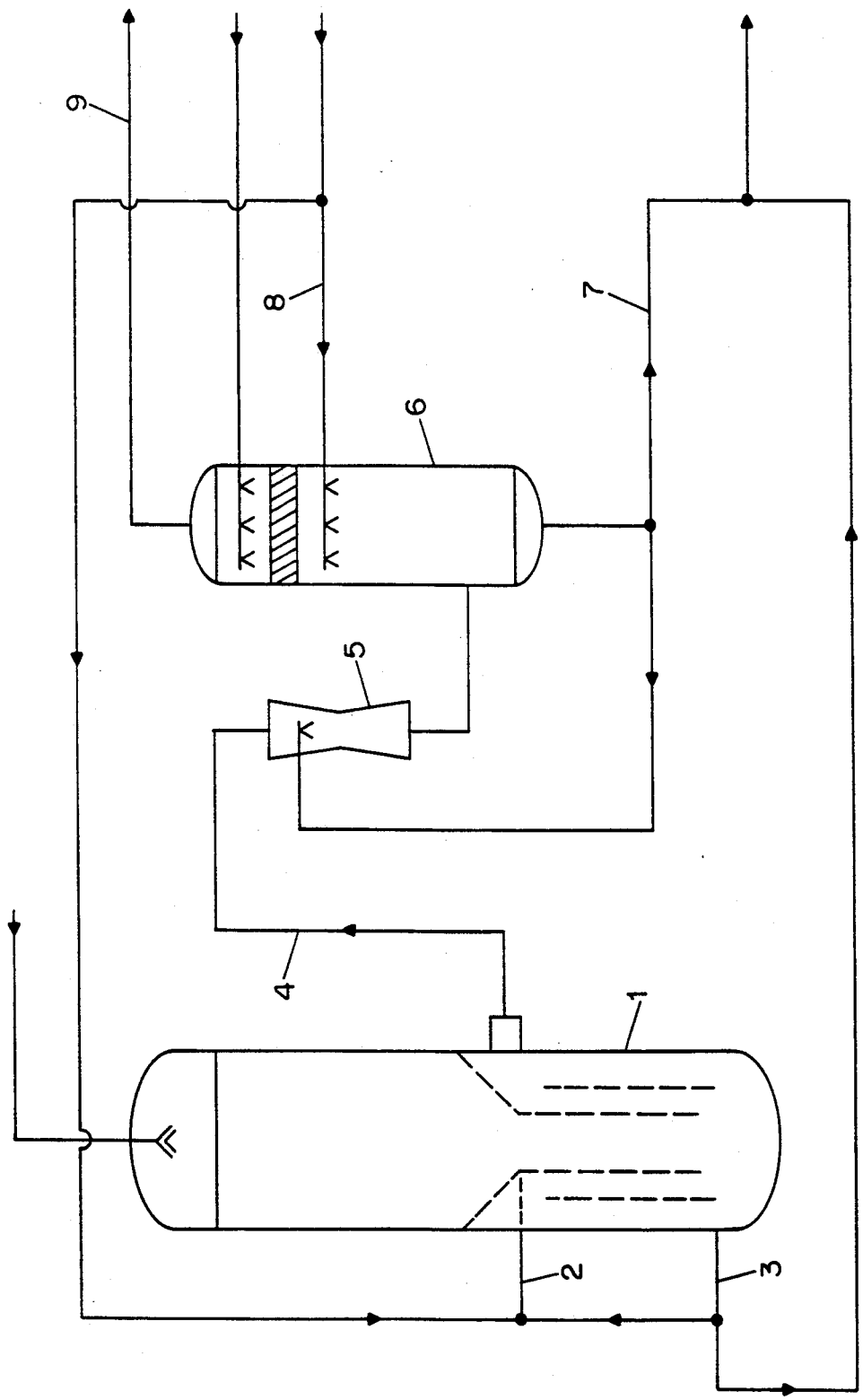

The invention is also well suited for the washing of process gas from gasification systems operating under high pressure, however, the temperatures of the process gas and the washing liquors should be adjusted in relation to the saturation temperature of steam at the operating pressures in the different washing stages.

Example of embodiment

Warm process gas containing melted droplets of chemicals having the composition shown below, is purified in a three stages cooling and washing system consisting of a liquid trap, a venturi scrubber and a spray tower.

| | |
|---|---|
| Composition of process gas: | |
| CO | 8.6 mol % |
| $CO_2$ | 11.4 mol % |
| $H_2O$ | 23.6 mol % |
| $H_2S$ | 0,1 mol % |
| $H_2$ | 11.0 mol % |
| $N_2$ | to balance |
| Composition of the melt: | |
| $Na_2CO_3$ | 61.4% by weight |
| $Na_2S$ | 28.1% by weight |
| NaOH | 10.1% by weight |

In a first cooling and washing stage 12000 $Nm^3/h$ of process gas at a temperature of 950° C. are forced into contact with a liquid having the following composition and flow:

|  |  |
|---|---|
| Na$_2$CO$_3$ | 8.6 kmol/h |
| NaOH | 3.8 kmol/h |
| Na$_2$S | 5.4 kmol/h |
| H$_2$O | 695 kmol/h |

The temperature of the washing liquid is about 50° C.

In this first stage the inorganic sodium compounds are separated from the gas and dissolved in the washing liquid and the resulting green liquor is drawn off to the green liquor system of the mill. The process gas now being almost completely free of sodium compounds, however, still contains 0.2 mol of H$_2$S/Nm$^3$. The gas is once again brought into contact with an alkaline washing liquid in a venturi scrubber. The washing liquid in this scrubber has a temperature of about 30° C. and has the following composition and flow:

|  |  |
|---|---|
| Na$_2$CO$_3$ | 1.1 kmol/h |
| NaOH | 7.5 kmol/h |
| Na$_2$S | 5.3 kmol/h |
| H$_2$O | 1420 kmol/h |

The resulting washing solution is mixed with the other washing liquids and is drawn off.

The temperature of the process gas after this stage has been reduced to about 60° C. The gas is finally washed in a spray tower.

The washing liquid in this stage has a temperature of about 30° C. and has the following composition and flow:

|  |  |
|---|---|
| Na$_2$CO$_3$ | 1.1 kmol/h |
| NaOH | 11 kmol/h |
| Na$_2$S | 1.8 kmol/h |
| H$_2$O | 1100 kmol/h |

In this washing stage the washing liquid is atomized in spray nozzles. The absorption of gaseous H$_2$S in this stage is particularly efficient and the concentration of H$_2$S in the outgoing process gas is below 5 mmol/Nm$^3$.

The process gas now essentially free from sulphur and sodium compounds has a temperature of about 50° C. and can be used for steam generation or replace fossil fuels.

We claim:

1. Process for the separation of sulphur and sodium compounds from a hot process gas generated during gasification of spent liquor from the kraft pulping industry, through contact with hydrogen sulphide ion and hydroxide ion containing alkaline wash liquids in two or more stages, characterized in that the process gas in a first stage is brought into contact with a wash liquid selected from the group consisting of water and an aqueous alkaline washing liquid by passing the process gas through a venturi throat, a liquid trap or a combination thereof, where melt droplets consisting essentially of water soluble sodium and sulfur compounds in the process gas are separated from the gas and drawn off as an aqueous solution, and where the process gas in a subsequent washing stage is brought into contact with a finely dispersed alkaline washing liquid other than green liquor containing hydroxide ions and hydrogen sulphide ions with a molar ratio of 8:1 or greater wherein said ratio of 8:1 or greater is higher than the molar ratio of hydroxide:hydrogen sulphide ions in the washing liquid used in the first stage, thereby avoiding reformation of gaseous hydrogen sulphide in the subsequent washing stage.

2. Process according to claim 1, characterized in that the first cooling and washing stage is preceded by a separation zone wherein most of the particles and droplets present in the process gas are separated from the gas.

3. Process according to claim 1, characterized in that the washing liquid used in each stage is selected from the group consisting of kraft pulp mill white liquor, kraft pulp mill weak liquor and sodium hydroxide.

4. Process according to any one of claims 1 to 3, characterized in that the gas washing is carried out in three or more stages.

5. Process according to any one of claims 1 to 3, characterized in that the washing system operates at pressures above ambient.

6. Process according to claim 1, wherein the molar ratio of hydroxide ion:hydrogen sulphide ion in the washing liquid employed in the subsequent washing stage is 8 to 25:1.

7. Process according to claim 4, wherein the washing system operates at pressures above ambient.

* * * * *

UNITED STATES PATENT AND TRADEMARK OFFICE
CERTIFICATE OF CORRECTION

PATENT NO. : 5,205,908

DATED : April 27, 1993

INVENTOR(S) : LARS STIGSSON ET AL.

It is certified that error appears in the above-identified patent and that said Letters Patent is hereby corrected as shown below:

Title page, 2nd Column, following the 2nd Line, insert
--328179  9/1970  Sweden
  448173  1/1987  Sweden--

Signed and Sealed this

Twenty-seventh Day of December, 1994

Attest:

BRUCE LEHMAN

Attesting Officer     Commissioner of Patents and Trademarks